April 6, 1965  S. L. ATCHERLEY, JR  3,176,999
SPORTS VEHICLE
Filed June 22, 1962　　2 Sheets-Sheet 1
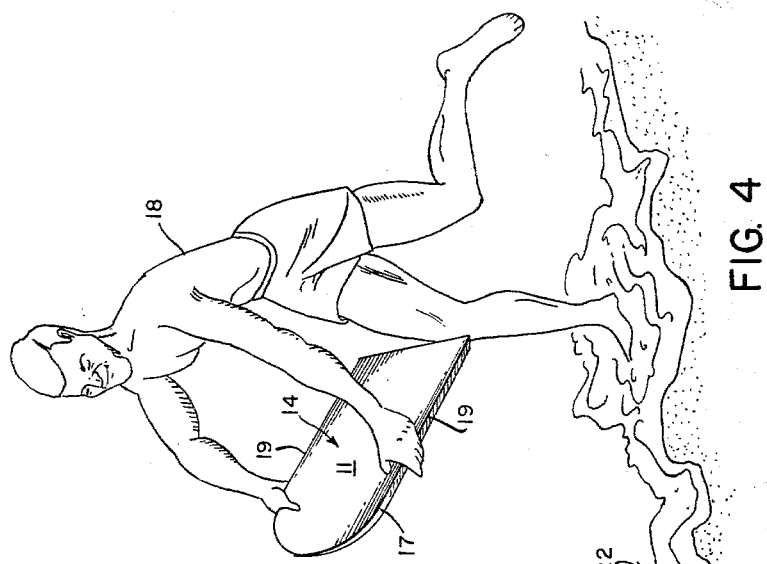
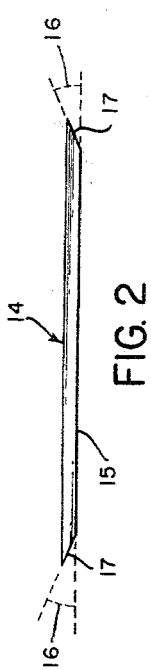
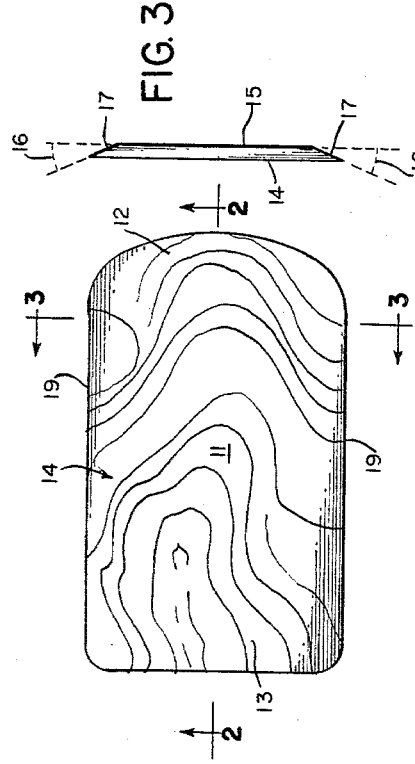
SAMUEL L. ATCHERLEY, JR
INVENTOR.
BY John J. Miller
Attorney April 6, 1965  S. L. ATCHERLEY, JR  3,176,999
SPORTS VEHICLE Filed June 22, 1962  2 Sheets-Sheet 2

SAMUEL L. ATCHERLEY, JR
INVENTOR.

BY John J. Miller
   Attorney

United States Patent Office 3,176,999
Patented Apr. 6, 1965

3,176,999
SPORTS VEHICLE
Samuel Lawrence Atcherley, Jr., XVIII Airborne Corps,
Fort Bragg, N.C.
Filed June 22, 1962, Ser. No. 205,485
2 Claims. (Cl. 280—12)

This invention relates generally to sports equipment and more particularly to sports vehicles used to assist sportsmen in traveling over the wet sand of wave-washed shores bordering bodies of water.

In the past, people in various areas of the world, particularly in the South Seas islands, have found an interesting sport in sliding on their bare chests or stomachs in the residual waters left by receding waves. To enlarge the enjoyment of this sport, various types of vehicles have been employed in attempts to obtain longer and therefore more enjoyable rides. None of these various devices, however, have proved satisfactory to any great extent.

After much experimentation with many shapes of vehicles, it has been discovered that, within close tolerances, a particular shape of device overcomes the inadequacies of prior known devices and allows the sportsman to obtain rides of a much longer distance than has heretofore been possible.

It has also been discovered that as waves recede, the residual water of 6 to 8 inches deep in which people have attempted skimming over on their stomachs or chests is a good area to make contact with the water traveling parallel to the shoreline and that as this residual water recedes leaving wet sand with a thin film of water, this film is more than adequate to support the moving vehicle of the present invention thereby allowing the rider to travel great distances while actually sliding on the wet sand and not on the residual water as hereinbefore thought necessary or desirable.

It is therefore an object of the present invention to provide a vehicle for traveling over wet sand left by receding waves, such vehicle being more rounded on its forward portion than its rear portion and being beveled about its periphery on the lower side toward its center at an angle of at least 45 degrees.

Another object of the present invention is to provide a vehicle for carrying an occupant over wet sand, said vehicle being constructed of a fairly rigid material and being beveled about its circumference on a plane intersecting a plane parallel to the top portion of the device at an angle between 45 and 60 degrees inwardly toward the bottom portion of said device.

A further object of the present invention is to provide a vehicle for carrying at least 1 occupant across wet sand by the momentum imparted to said occupant and vehicle prior to said vehicle's contact with said sand, said vehicle being outwardly flared from its bottom toward its top portion about its circumference at an angle of approximately 45 degrees.

A further object of the present invention is to provide a vehicle for traveling across wet sand composed of a fairly rigid material and having overall dimensions of approximately twice as long as the vehicle is wide and having downwardly and inwardly beveled edges about its circumference.

Other objects and advantages of the present invention will become apparent and obvious from a study of the following description and the accompanying drawings which are merely illustrative of the present invention.

In the drawings:

FIGURE 1 is a top plane view disclosing the proportional size of the upper surface of the present invention;

FIGURE 2 is a side elevational view of the present invention taken from lines 2—2 of FIGURE 1;

FIGURE 3 is an end elevational view of the present invention taken from lines 3—3 of FIGURE 1;

FIGURE 4 is a perspective of a sportsman preparing to use the device of the present invention.

Figure 5:
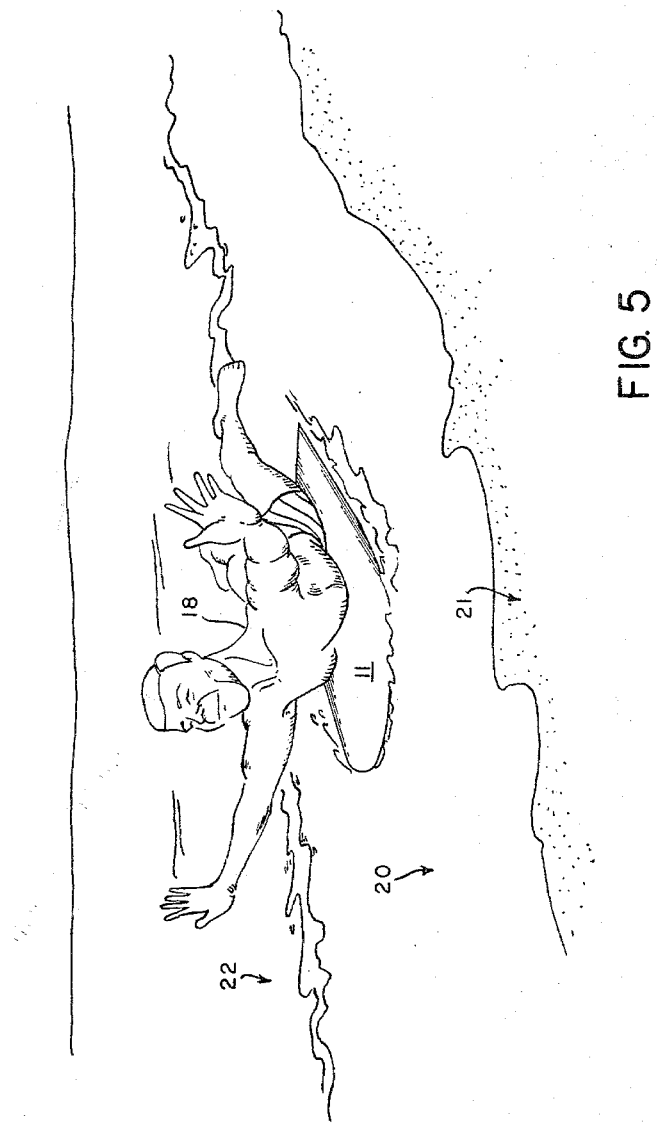
FIGURE 5 is a perspecitve of the vehicle of the present invention in actual operation showing the relation of receding water, wet sand and dry sand.

With further reference to the drawings, the relatively flat vehicle 11 having substantially parallel upper and lower surfaces, is composed of a fairly rigid board-like material such as solid wood, plywood, fiberglass, aluminum, plastic or the like has a generally arcuately curved forward portion 12 and a rear portion 13 with rounded corners and a generaly right-angularly extending rear edge. The overall length of the vehicle being approximately twice its width.

The complete periphery of the vehicle is sloped or beveled inwardly from the upper surface 14 to the lower surface 15 forming upper and lower edges as particularly disclosed in FIGURES 2 and 3.

The angle 16 of the bevel is determined by the intersecting angle of a plane adjacent to the beveled side 17 and a second plane adjacent to the bottom portion or surface 15. It has been found that this angle is critical to obtain maximum speed and distance from a wet sand vehicle of the present type. This critical angle 16 has been found to be between 45 and 60 degrees with satisfactory results being obtainable with an angle of up to 60 degrees but undesirable results being obtained when the angle is less than 45 degrees.

In the use of a vehicle made in accordance with the present invention, the sportsman 18 grasps the longitudinally extending side edges 19 of the vehicle 11 with the upper surface 14 toward him. The sportsman then waits for a wave to wash upon the shore, whereupon he gets a running start and falls or jumps on the board in the water just as the water begins to recede from shore. The sportsman will now skim across the top of the water and as the water recedes, it will leave only wet sand 20 which the momentum of the vehicle and occupant will allow such vehicle and occupant to continue to travel or slide across the wet sand for a considerable distance until forward momentum is lost due to normal friction or dry sand 21 is encountered which acts as a braking means for stopping such vehicle. In actual trials, a device of the present type has been known to travel in excess of 100 yards along the beach over wet sand paralleling the shore line.

The reason such long distances of travel are possible with a vehicle of the type disclosed in the present invention is that momentum is obtained across the water 22 as the wave initially begins to recede and such momentum is carried over when the water recedes beyond the path of travel of the vehicle so that such vehicle is actually traveling over wet sand 20. The critical proportions of the vehicle allow it to skim over such wet sand 20 with a minimum of friction and resistance. The receding water 22 is not necessary or desirable to travel over except during the initial start of the vehicle.

The position of the sportsman 18 on the vehicle 11 during the travel of such vehicle is preferably prone with arms outstretched so that no part of the body is in contact with any surface other than the vehicle. It is possible, however, for such sportsman to place the vehicle in motion and then assume a standing position during the travel of such vehicle.

Lateral control of the vehicle may be obtained when the sportsman is in prone position by lightly touching the wet sand on the side of desired directional movement, thereby causing the vehicle to gently turn in that direction. Emergency stopping of such vehicle may also be obtained by the sportsman's simultaneously contacting the wet sand with his hands on either side of the vehicle.

It will be obvious that the vehicle of the present invention is constructed and adapted to propel an occupant over wet sand left by receding waves on wavewashed shores bordering bodies of water for distances greatly in excess of those hereinbefore obtainable. Due to the enjoyment derived by people in obtaining such long-distance rides, the present invention will prompt more individuals into taking exercise which is so necessary in maintaining a high standard of health and physical fitness.

The present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

I claim:

1. A personally portable sand slide vehicle for use on seashore sand left wetted by receding wave action, the vehicle utilizing the momentum of a user thereof in motion just prior to its being placed in sliding contact with the wetted sand and the simultaneous occupancy thereof by the user when the vehicle is in sand contact for sliding movement over the wetted sand, said vehicle comprising a substantially rigid board-like structure having a length-to-width ratio of approximately 2 to 1, said structure having oppositely angled side and end walls and flat upper and lower surfaces, said upper and lower surfaces being disposed substantially parallel throughout their entirety, said oppositely angled side walls having substantially parallel edges extending longitudinally of said structure, said end walls having edges, the edge of one said end wall extending generally perpendicular to and arcuately merging into said side wall edges, the other of said end wall edges comprising a front end edge of forwardly curved and generally arcuate configuration, the surface of each of said side walls and said end walls being of a slope to form a beveled surface terminating in said upper and lower flat surfaces, said beveled surfaces tapering inwardly from said top surface to said lower surface at an angle of at least 45 degrees but not more than 60 degrees with respect to said lower surface to form a continuous slope throughout the entire periphery of said structure.

2. A personally portable sand slide vehicle for use on seashore sand left wetted by receding wave action, the vehicle utilizing the momentum of a user thereof in motion just prior to its being placed in sliding contact with the wetted sand and the simultaneous occupancy thereof by the user when the vehicle is in sand contact for sliding movement over the wetted sand, said vehicle comprising a substantially rigid board-like structure having oppositely angled side and end walls and flat upper and lower surfaces, said upper and lower surfaces being disposed substantially parallel throughout their entirety, said oppositely angled side walls having substantially parallel side edges extending longitudinally of said structure, said end walls having edges, the edge of one of said end walls extending generally perpendicular to said side wall edges, the other of said end wall edges comprising a front end edge of forwardly curved and generally arcuate configuration, the surface of each of said side walls and said end walls being of a slope to form a beveled surface terminating in said upper and lower flat surfaces, said beveled surfaces tapering inwardly from said top surface to said lower surface at an angle of at least 45 degrees with respect to said lower surface to form an inclined surface throughout the entire periphery of said vehicle.

References Cited by the Examiner

UNITED STATES PATENTS

| | | | |
|---|---|---|---|
| D. 194,489 | 1/63 | Stevens | 9—310 |
| 1,023,601 | 4/12 | Simpson | 9—310 |
| 1,323,732 | 12/19 | Allen | 9—310 |
| 2,601,991 | 7/52 | Kahle | 280—19 |
| 2,735,115 | 2/56 | Dees | 9—310 |
| 3,045,264 | 7/62 | Smith | 9—310 |

ARTHUR L. LA POINT, *Primary Examiner.*

PHILIP ARNOLD, A. HARRY LEVY, *Examiners.*